United States Patent
Wolf

(10) Patent No.: US 8,651,211 B2
(45) Date of Patent: Feb. 18, 2014

(54) COOLING DEVICE FOR A MOTOR VEHICLE

(75) Inventor: Thomas Wolf, Riedstadt (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/603,458

(22) Filed: Sep. 5, 2012

(65) Prior Publication Data

US 2013/0062132 A1    Mar. 14, 2013

(30) Foreign Application Priority Data

Sep. 12, 2011  (DE) .......................... 10 2011 053 500

(51) Int. Cl.
*B60K 11/00*   (2006.01)

(52) U.S. Cl.
USPC ................. 180/68.1; 180/68.2; 296/180.5

(58) Field of Classification Search
USPC ......... 180/68.1, 68.2, 68.3; 296/180.5, 180.1, 296/217
See application file for complete search history.

(56) References Cited

U.S. PATENT DOCUMENTS

| 4,889,382 | A |   | 12/1989 | Burst et al. |   |
|---|---|---|---|---|---|
| 5,120,105 | A |   | 6/1992 | Brin et al. |   |
| 5,141,281 | A | * | 8/1992 | Eger et al. | 296/180.5 |
| 5,923,245 | A | * | 7/1999 | Klatt et al. | 180/68.3 |
| 6,382,708 | B1 | * | 5/2002 | Erdelitsch et al. | 296/180.5 |
| 6,655,727 | B2 | * | 12/2003 | Hill et al. | 296/180.5 |
| 7,380,870 | B2 | * | 6/2008 | Froeschle et al. | 296/180.5 |
| 7,387,331 | B2 | * | 6/2008 | Froeschle et al. | 296/180.5 |
| 7,438,347 | B2 | * | 10/2008 | Froeschle et al. | 296/180.5 |
| 7,878,582 | B2 | * | 2/2011 | Fidan et al. | 296/217 |
| 8,096,347 | B2 | * | 1/2012 | Starkey et al. | 165/41 |
| 8,172,307 | B2 | * | 5/2012 | Froeschle et al. | 296/180.1 |
| 8,177,288 | B2 | * | 5/2012 | Molnar et al. | 296/180.5 |
| 8,225,852 | B2 | * | 7/2012 | Wu et al. | 165/140 |
| 8,226,153 | B2 | * | 7/2012 | Molnar et al. | 296/180.1 |

FOREIGN PATENT DOCUMENTS

| DE | 648 055 | 7/1937 |
|---|---|---|
| DE | 745 299 | 3/1944 |
| DE | 36 15 584 | 11/1987 |
| DE | 39 16 692 | 11/1990 |
| DE | 40 09 385 | 9/1991 |
| DE | 198 06 610 | 8/1999 |
| DE | 697 14 455 | 4/2003 |
| DE | 10 2010 036 595 | 1/2012 |

* cited by examiner

*Primary Examiner* — Hau Phan
(74) *Attorney, Agent, or Firm* — Gerald E. Hespos; Michael J. Porco; Matthew T. Hespos

(57) ABSTRACT

A cooling device for a motor vehicle has an internal combustion engine in a rear region of a vehicle body and has a charge air cooler arranged below an extendable rear spoiler. The charge air cooler is arranged in an oblique plane in an air deflection duct of the vehicle body and has inflow air flowing through it. Downstream of the charge air cooler, the air deflection duct is configured as an outflow air nozzle that narrows toward the end and is arranged to achieve a horizontal discharge of the outflow air.

16 Claims, 2 Drawing Sheets

COOLING DEVICE FOR A MOTOR VEHICLE

CROSS REFERENCE TO RELATED APPLICATION

This application claims priority under 35 USC 119 to German Patent Appl. No. 10 2011 053 500 filed on Sep. 12, 2011, the entire disclosure of which is incorporated herein by reference.

BACKGROUND OF THE INVENTION

1. Field of the Invention

The invention relates to a cooling device for a motor vehicle.

2. Description of the Related Art

DE 198 06 610 C2 discloses a motor vehicle with a spoiler arranged fixedly on the upper side of a rear region of the vehicle. The spoiler feeds cooling air for an air cooler arranged horizontally below the spoiler.

The object of the invention is to provide a cooling device for a rear-engine motor vehicle with an extendable spoiler. The cooling device comprises a cooler in the rear region of the vehicle that is advantageous in terms of flow and cooling effect.

SUMMARY OF THE INVENTION

The invention provides an aerodynamically advantageous arrangement of a charge air cooler in the rear of the vehicle body that enables a cooler outflow air to flow out horizontal to the roadway. The charge air cooler is arranged fixedly in an air deflection duct formed in the rear region of the vehicle body. Cooler inflow air leads into the air deflection duct from the vehicle upper side upstream of the rear spoiler via a lead-in opening when the rear spoiler is extended from the vehicle body and cooler outflow air leads out via a rear-side outlet opening of an outflow air nozzle.

An upper air guide wall of the air deflection duct is formed starting from the rear spoiler and the vehicle body forms a lower air guide wall opposite the upper air guide wall. The air duct extends in an approximately arcuate manner from the lead-in opening on the upper side of the vehicle body down to the lower rear-side outlet opening.

The charge air cooler is arranged inside the air deflection duct in a plane that is oblique to a horizontal plane. An air outlet side of the charge air cooler is adjoined by the outflow air nozzle, which narrows continuously from the charge air cooler to the outlet opening. The cooler outflow air can advantageously be discharged horizontally to the roadway of the vehicle by arranging the lower wall in a horizontal plane and an upper horizontal end portion of the outflow air nozzle.

This arrangement of the charge air cooler and the configuration of the air deflection duct and the outflow air nozzle discharges cooling air horizontally through the opening in the rear part. This arrangement provides aerodynamic advantages since the cooler outflow air flow in the rear region leads to a pressure increase that influences the wake and increases the rear base pressure. Consequently, the air resistance is reduced and the arrangement is uplift-neutral. More particularly, the horizontal discharge of the cooling air parallel to the roadway avoids an increased rear axle uplift that occurs when discharging the cooling air down toward the roadway. The resistance-reducing effect of the arrangement is reinforced by a cross-sectional narrowing of the outflow air nozzle, which results in a flow acceleration and thus a momentum recovery and a momentum thrust.

The rear cover of the vehicle below a spoiler leaf of the rear spoiler may have air-permeable stamped formations that guide the cooler inflow air to the concealed charge air cooler even with a rear spoiler retracted into the vehicle body. The stamped formations form air ducts that lead the cooling air into the vehicle body to the air deflection duct and outwardly through the charge air cooler.

An exemplary embodiment of the invention is illustrated in the drawings and is described in more detail below.

DETAILED DESCRIPTION OF THE PREFERRED EMBODIMENT

Figure 1:
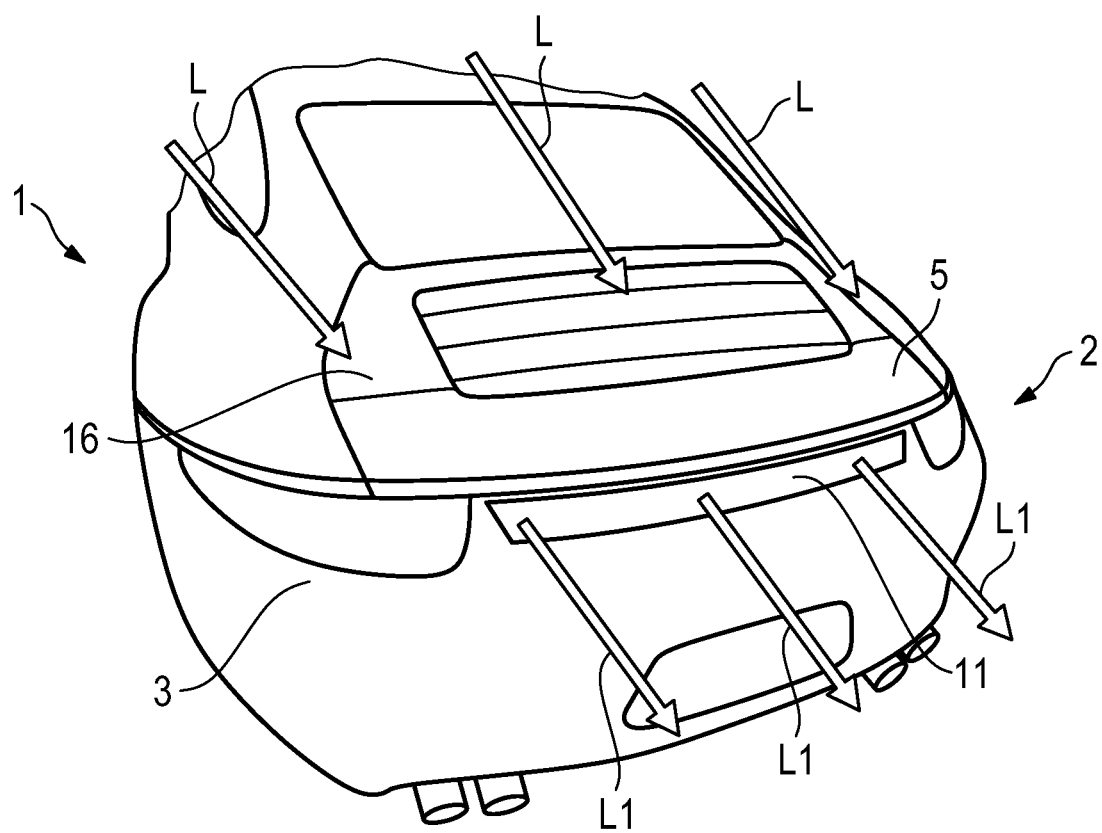
FIG. 1 is a rear view of a vehicle with retracted rear spoiler and cooler inflow air flowing in through stamped formations in the rear cover of the vehicle and cooler outflow air flowing out of an outlet opening of an outflow air nozzle.

A motor vehicle 1 in accordance with the invention has a rear region 2 and a vehicle body 3. An internal combustion engine 4 and a retractable and extendable rear spoiler 5 are arranged in the rear region 2 of the vehicle body 3. A charge air cooler 6 is arranged below the rear spoiler 5, as shown in more detail in FIG. 2.

The charge air cooler 6 is arranged fixedly in an air deflection duct 7 formed in the rear region 2 of the vehicle body 3. The duct 7 is formed by air guide walls 8, 9 on the rear spoiler 5 and on the vehicle body 3 respectively. The charge air cooler 6 is adjoined downstream by an outflow air nozzle 15.

Figure 2:
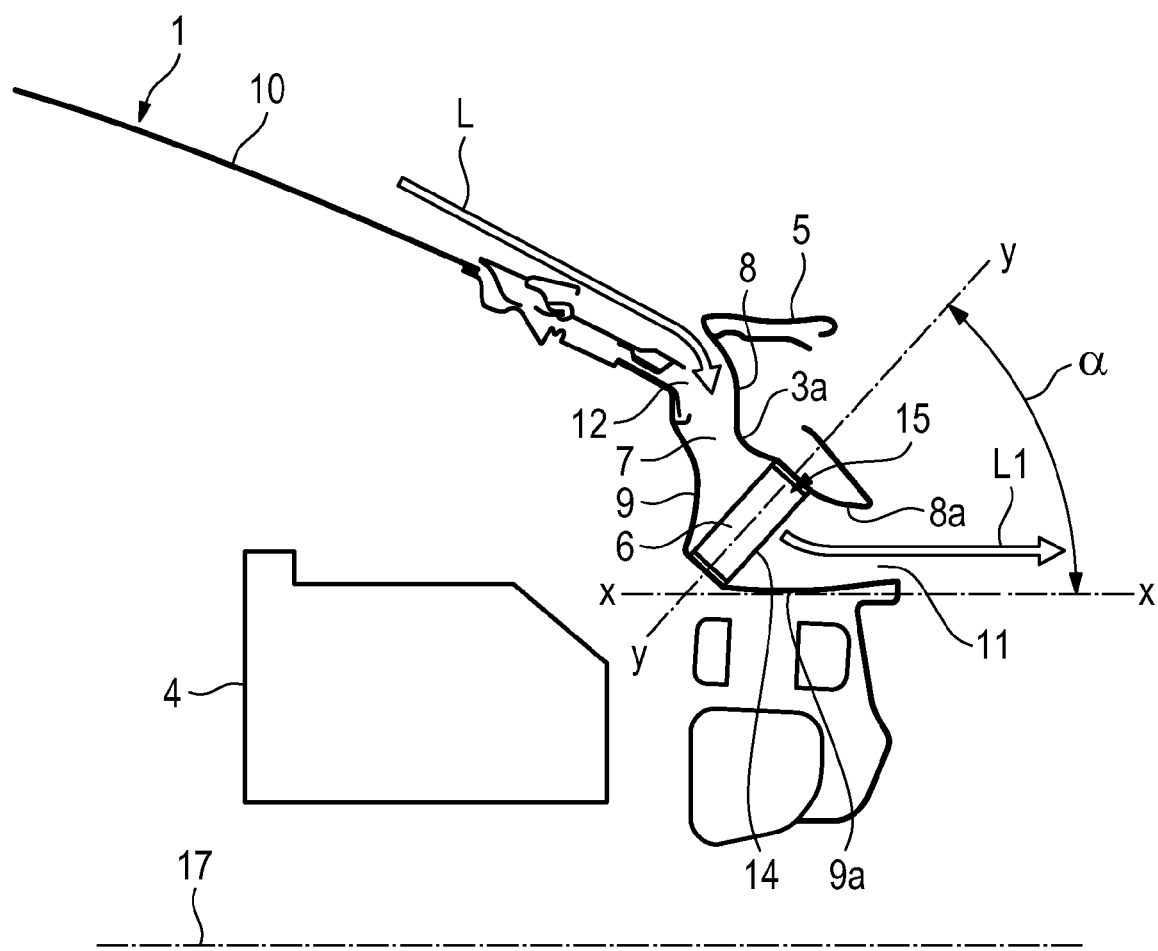
FIG. 2 is a vertical longitudinal section through a rear of a vehicle with extended rear spoiler and a charge air cooler arranged obliquely in an air deflection duct.

With the rear spoiler 5 extended, as shown in FIG. 2, the cooler inflow air L is channeled into the air deflection duct 7 from the vehicle upper side 10 upstream of the rear spoiler 5 via a lead-in opening 12 and is guided through the charge air cooler 6 exposed in the duct 7. The cooler outflow air L1 flows off out via a rear outlet opening 11 of the outflow air nozzle 15 in the vehicle body 3.

The upper air guide wall 8 starts from the rear spoiler 5 and extends continuously to a vehicle component 3a. The further lower air guide wall 9 is opposite the upper air guide wall 8 and is formed by the vehicle body or by parts of the vehicle body 3. The air deflection duct 7 extends in an approximately arcuate manner from the lead-in opening 12 on the upper side 10 of the vehicle body 3 to the lead-out opening or outlet opening 11 in the rear 2 of the vehicle 1.

The charge air cooler 6 preferably is held within the air deflection duct 7 in an oblique plane y-y that is positioned with respect to a horizontal plane x-x approximately at an angle alpha of approximately 45°. The outflow air nozzle 15 narrows in a nozzle-like manner and adjoins the charge air cooler 6 from the air outlet side 14 of the charge air cooler 6 to the outlet opening 11. The lower wall 9a and the upper end region 8a of the outflow air nozzle 15 is oriented approximately horizontally. As a result, the cooler outflow air L1 can be discharged horizontally to the roadway 17, as shown in FIG. 2.

With a rear spoiler 5 retracted into the vehicle body, as shown in FIG. 1, the cooler inflow air L is channeled through appropriate air-permeable stamped formations or the like in the rear cover 16 of the vehicle under a spoiler leaf 5a of the rear spoiler 5, is fed to the concealed charge air cooler 6, flows through the charge air cooler 6 and is discharged outwardly through the outflow air nozzle 15.

What is claimed is:

1. A cooling device for a motor vehicle, the motor vehicle having a vehicle body with a rear region, an internal combustion engine and an extendible rear spoiler arranged in the rear region of the vehicle body, an air deflection duct formed in the rear region of the vehicle body, the air deflection duct having an inlet forward of the rear spoiler and an outlet rearward of and lower than the rear spoiler, a charge air cooler arranged fixedly in the air deflection duct and being below the rear spoiler when the rear spoiler is extended from the vehicle body, whereby inflow air for the charge air cooler leads into the air deflection duct from the inlet, and outflow air from the charge air cooler leads out via an outflow air nozzle that communicates with the outlet.

2. The cooling device of claim 1, wherein the air deflection duct extends arcuately from the inlet down to the outlet.

3. The cooling device of claim 1, the charge air cooler is aligned oblique to a plane on which the motor vehicle is supported.

4. The cooling device of claim 1, wherein the outflow air nozzle is adjoined to an air outlet side of the charge air cooler.

5. The cooling device of claim 4, wherein the outflow air nozzle narrows continuously from the charge air cooler to the outlet opening.

6. The cooling device of claim 1, wherein the air deflection duct has upper and lower air guide walls opposed to one another, the upper guide wall having an upstream end at a forward end of the rear spoiler, the lower air guide wall being formed by the vehicle body.

7. The cooling device of claim 6, wherein the outflow air nozzle is arranged in a plane substantially parallel to a roadway surface on which the vehicle is supported so that the outflow air is discharged substantially parallel to the roadway surface.

8. The cooling device of claim 7, wherein the lower air guide wall includes a wall portion forming part of the outflow air nozzle and being aligned substantially parallel to the roadway surface on which the vehicle is supported.

9. The cooling device of claim 8, wherein the upper guide wall has an end portion forming part of the outflow air nozzle and opposed to the substantially horizontal wall portion of the lower air guide wall.

10. The cooling device of claim 1, wherein the rear region of the vehicle body has a rear cover forward of the rear spoiler, the rear cover being formed with air-permeable stamped formations configured for guiding the inflow air below a spoiler leaf of the rear spoiler when the rear spoiler is retracted, so that the inflow air can be fed to the charge air cooler and guided out via the outflow air nozzle when the rear spoiler is retracted.

11. A motor vehicle comprising: a vehicle body with a rear region, an internal combustion engine and an extendible rear spoiler in the rear region of the vehicle body, an air deflection duct formed in the rear region of the vehicle body, the air deflection duct having an inlet forward of the rear spoiler and an outlet rearward of and lower than the rear spoiler, a charge air cooler arranged fixedly in the air deflection duct and being below the rear spoiler when the rear spoiler is extended from the vehicle body, an outflow air nozzle adjoined to an air outlet side of the charge air cooler and communicating with the outlet, the outflow air nozzle narrowing from the charge air cooler to the outlet, whereby inflow air for the charge air cooler leads into the air deflection duct from the inlet, and outflow air from the charge air cooler leads out to the outlet via the outflow air nozzle.

12. The motor vehicle of claim 11, wherein the air deflection duct extends arcuately from the inlet down to the outlet.

13. The motor vehicle of claim 11, the charge air cooler is aligned oblique to a plane on which the motor vehicle is supported.

14. The motor vehicle of claim 13, wherein the outflow air nozzle is arranged in the plane substantially parallel to the roadway surface on which the vehicle is supported so that the outflow air is discharged substantially parallel to the roadway surface.

15. The motor vehicle of claim 14, wherein the rear region of the vehicle body has a rear cover forward of the rear spoiler, the rear cover being formed with air-permeable stamped formations configured for guiding the inflow air below a spoiler leaf of the rear spoiler when the rear spoiler is retracted, so that the inflow air can be fed to the charge air cooler and guided out via the outflow air nozzle when the rear spoiler is retracted.

16. The motor vehicle of claim 11, wherein the rear region of the vehicle body has a rear cover forward of the rear spoiler, the rear cover being formed with air-permeable stamped formations configured for guiding the inflow air below a spoiler leaf of the rear spoiler when the rear spoiler is retracted, so that the inflow air can be fed to the charge air cooler and guided out via the outflow air nozzle when the rear spoiler is retracted.

* * * * *